United States Patent

Klein

[15] 3,699,535

[45] Oct. 17, 1972

[54] MEMORY LOOK-AHEAD CONNECTION ARRANGEMENT FOR WRITING INTO AN UNOCCUPIED ADDRESS AND PREVENTION OF READING OUT FROM AN EMPTY ADDRESS

[72] Inventor: Stanley Frank Klein, Framingham, Mass.

[73] Assignee: Raytheon Company, Lexington, Mass.

[22] Filed: Feb. 1, 1971

[21] Appl. No.: 111,427

[52] U.S. Cl. ....................340/172.5

[51] Int. Cl. ....................G11c 11/02

[58] Field of Search ....................340/172.5

[56] References Cited

UNITED STATES PATENTS

| | | | |
|---|---|---|---|
| 3,328,765 | 6/1967 | Amdahl et al. | 340/172.5 |
| 3,365,704 | 1/1968 | Ulrich | 340/172.5 |
| 3,398,405 | 8/1968 | Carlson et al | 340/172.5 |
| 3,405,394 | 10/1968 | Dirac | 340/172.5 |
| 3,440,615 | 4/1969 | Carter | 340/172.5 |
| 3,599,159 | 8/1971 | Creech et al. | 340/172.5 |

*Primary Examiner*—Gareth D. Shaw
*Assistant Examiner*—Melvin B. Chapnick
*Attorney*—Milton D. Bartlett, Joseph D. Pannone and David M. Warren

[57] ABSTRACT

A memory interconnection or wiring arrangement which prevents a valid word in the memory from being destroyed by overwriting and also prevents an empty or obsolete memory word from being read out, thereby conserving both time and power. The arrangement involves the employment of one or two additional memory planes or additional bistable storage elements and circuitry which are used to store tag words which indicate whether a forthcoming memory address contains valid or obsolete information. In this arrangement, a tag or status indication signal is written in the additional memory elements to indicate that a word has been written into the current address location. Simultaneously, the state of a second tag or status indicating signal is read or detected to determine whether the forthcoming address location is empty or contains valid information. The detection of this tag during read out is used to determine whether the reading or writing process should continue, stop or search for another address location. The arrangement can be used with core memories, solid state memories, plated wire and thin film memories or any other device in which the interconnection or wiring between the main memory and additional storage and electronic elements can be controlled.

17 Claims, 6 Drawing Figures

MEMORY LOOK-AHEAD CONNECTION ARRANGEMENT FOR WRITING INTO AN UNOCCUPIED ADDRESS AND PREVENTION OF READING OUT FROM AN EMPTY ADDRESS

BACKGROUND OF THE INVENTION

This invention relates to systems for information storage and retrieval, and more particularly to digital data storage systems having apparatus for detecting the availability of storage locations for entering or retrieving digital data.

In a typical memory using binary storage elements the cores in a matrix are composed of magnetic material capable of retaining either of two opposite magnetic remanence states indefinitely unless switched to the other magnetic state by a current along wires passing through the matrix. These two magnetic states conventionally employed for representing digital information are arbitrarily designated as 0 and 1. Selective passage of current through the core driver wires switches the desired pattern of cores to a selected state, where each core in the pattern has either the value 0 or the value 1. One way this switching can be accomplished is by the coincidence of current along two wires intersecting at the selected core, each wire carrying half-select current, i.e., half of the current necessary to induce magnetism sufficient to switch the core between states. Once the cores of the memory matrix are loaded with data, the data remains until destroyed or replaced. In a conventional coordinate address memory system, data which is stored in the form of a particular word, as indicated by the individual magnetic states of a group of cores, is selected for read out by specifying its address or location within the memory matrix. Also, data can be written into the memory by specifying the address or location of a particular group of cores. However, it is important that in many memory systems, whether sequential or random access, that a word stored in the memory should not be destroyed by overwriting, that is, by writing a second word over a presently stored word. In addition, it is often desirable not to select, for purposes of reading out data, any word location or address which contains obsolete or no data, any word location or address which contains obsolete or no data, herein defined, for example, as the condition in which all cores of such address are in the zero state.

In the past, the examination of individual groups of cores forming words to avoid overwriting and to avoid attempted read out of addresses or word locations containing no data, required considerable additional apparatus which was both costly and complex. For example, it became necessary to use a complete additional memory or a major portion of the present memory of the system being used in order to store status information of addresses of the memory which presently either contained or did not contain valid data. This added or auxiliary memory apparatus required the usual word and bit drivers and read out amplifiers to determine the status of a particular memory address. It generally required the expenditure of additional time used in the separate interrogation of the added memory apparatus. It is therefore an important object of the invention to provide a means for determining the status of a particular word location or memory address with the use of only minimal additional apparatus and without the expenditure of substantial additional interrogation time.

Another object of the present invention is to provide an improved data storage and retrieval system that is relatively simple in construction and operation, and yet highly efficient in use.

A further object of the invention is to provide an improved address availability interrogating or sensing circuit which generates a signal indicative of the status of the interrogated address or memory location for either the storage of new information or the extraction of previously stored data.

SUMMARY OF THE INVENTION

In accordance with the present invention, the availability of a first address of a memory system to receive new data without overwriting data previously stored in the address is achieved by providing a pair of memory planes in addition to the memory planes presently in use in a memory matrix, the first additional memory plane being used to store a signal which, in response to a read out, indicates that data has already been stored in the first address of the memory matrix, the second additional memory plane being used on read out to provide a signal which indicates whether a second memory address following the first address of the memory matrix already contains data. When, during read out, data is thereby detected in the address following the first address of the memory matrix, overwriting into such address is prevented; and when no data is detected in the address following the first address of the memory matrix, the process of reading from such empty address is prevented. In an alternative embodiment, both additional memory planes are interconnected to form a single memory plane.

To introduce the above referred to indicating data into the additional memory plane, the invention discloses a particular serial interconnection of word windings between the cores of such two additional memory planes with corresponding word windings on cores of the memory matrix, sometimes known as the main memory matrix. Thus, in addition to well-known bit input and output windings, each core of the additional memory planes has word windings which are connected in series with corresponding word windings on cores of the memory planes forming the memory matrix. While the word windings of the memory matrix are connected to the corresponding word windings in one of the additional memory planes, they are also connected to the word windings immediately preceding the corresponding cores in the other additional memory plane. Thus, by the above threading arrangement, when the serially connected word windings are activated for the purpose of transferring data into or out of a particular location in the memory matrix, the corresponding word winding of one additional memory plane is activated and the winding immediately preceding the corresponding word winding on the other additional memory plane is also activated. When an individual core of one additional memory plane is activated or receives a write signal, its magnetic state provides a signal herein referred to as a tag, which is used to indicate or detect that data has been stored in a particular word location in the memory matrix so as to preclude overwriting. When an individual core in the other additional memory plane is activated by a read signal, its magnetic state provides an additional signal or tag which can be used to indicate whether or not data has been stored in the next word location thus precluding reading from an empty word location.

It should be understood that storage of information in the memory or memory system is not to be limited or magnetic cores forming memory planes inasmuch as thin film memory planes or plated wire magnetic memory storage can be used. In addition, a memory system made up of bistable flip-flops rather than magnetic material can also be used and is described in a further embodiment of the invention.

BRIEF DESCRIPTION OF THE DRAWINGS

For a better understanding of the present invention, together with other and further objects and advantages thereof, reference is made to the following description taken in connection with the accompanying drawings, in which.

DESCRIPTION OF THE PREFERRED EMBODIMENT

Figure 1:
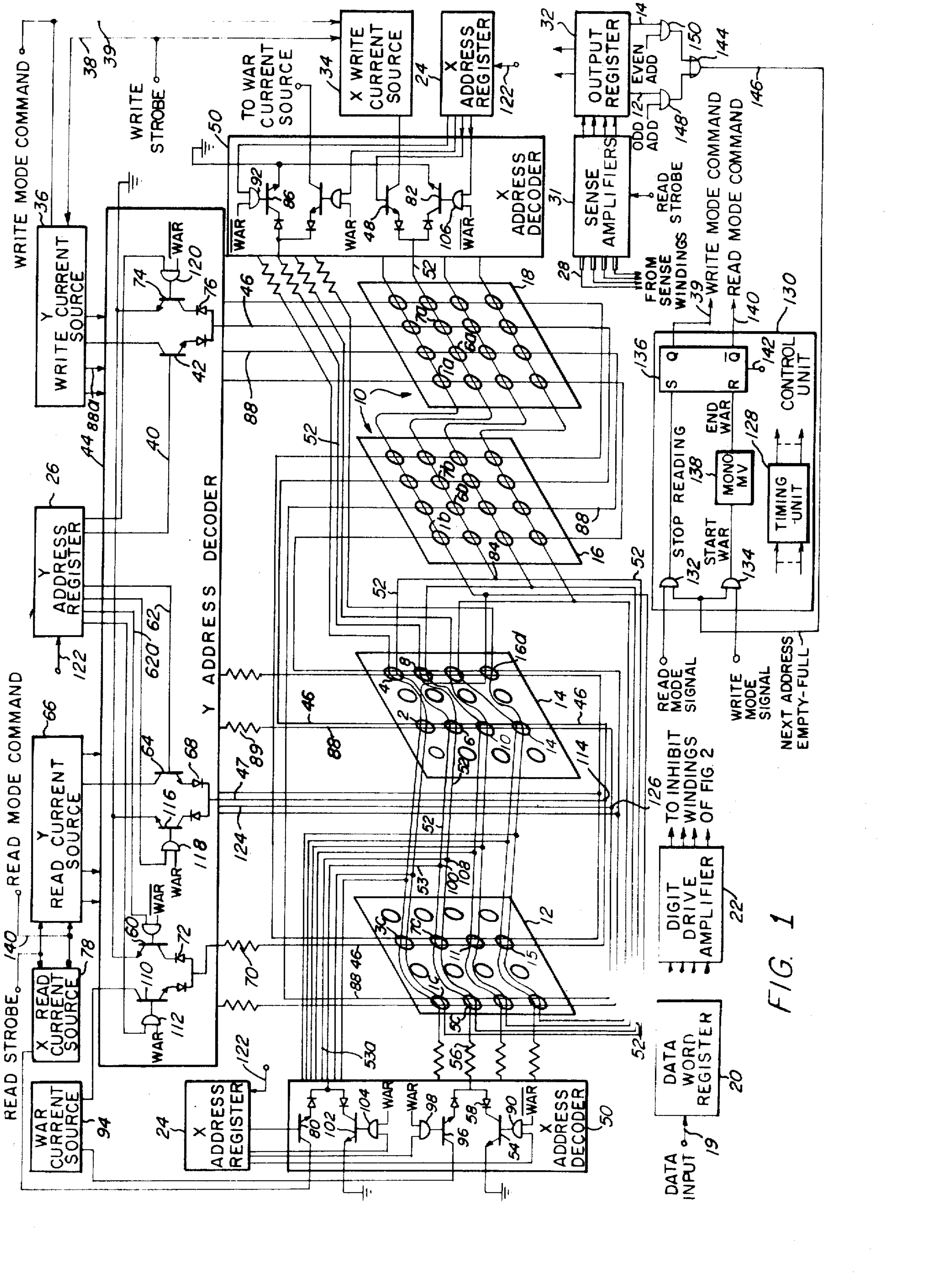
FIG. 1 is a schematic circuit diagram of a memory matrix employing additional memory planes for indicating the condition of the memory matrix.

Referring to FIG. 1, there is shown a memory system to illustrate in general the manner in which the write and read operations are carried out in the practice of this invention. At the heat of the memory system shown in this figure is a memory matrix 10 made up of memory planes 12, 14, 16 and 18 herein shown as insulating frames which support the magnetic elements connected in rows and columns, the elements being capable of storing digital data and of delivering up portions of stored data upon command. While four planes of the memory matrix 10 are shown, it should be understood that the planes 16 and 18 which form the main memory portion of the matrix 10 can have a plurality of planes interconnected between them so as to increase its storage capacity. In particular, each of the four planes of memory matrix 10 contains discrete bit storage elements arranged in this illustrative example in four horizontal bit tows intersected by four vertical bit rows. A typical word in the matrix 10 is composed of one bit from each memory plane; that is, one bit each from planes 16 and 18 forming the main memory matrix and one bit each from the two additional planes 12 and 14 which have been added for the purpose of practicing the invention.

Figures 2, 3, 5:
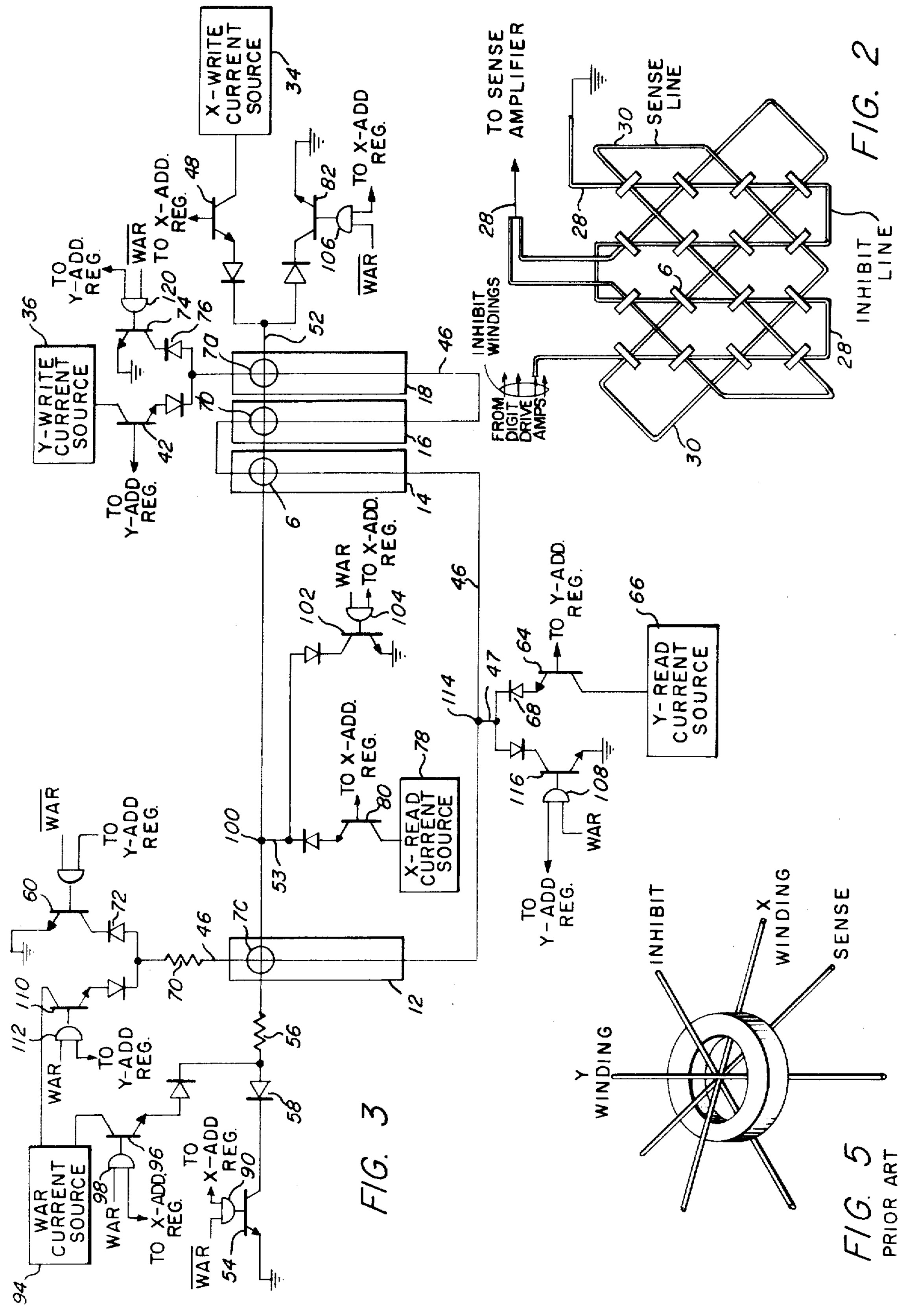
FIG. 2 is a schematic circuit diagram of the inhibit and sense windings for any of the memory planes of FIG. 1.
FIG. 3 is a simplified schematic circuit showing a single X and a singly Y winding of the circuit shown in FIG. 1.
FIG. 5 is an enlarged perspective illustration of a magnetic core and the several windings threaded therethrough.

In the use of the memory matrix the first step is to store or write within it the digital data to be processed. In accordance with well-known techniques this is accomplished by first feeding data from an external source, such as a radar system, into data word register 20. This register is a well-known digital storage device utilizing, for example, a plurality of flip-flops containing binary information which has been entered from the radar after conventional conversion from an analog radar signal to a binary input signal. In other instances, the input data can arrive by way of line 19 from another digital source such as a computer. The data which is contained in the data word register 20 is transmitted via well-known digit drive amplifiers 22 to individual selection or inhibit windings in each of the four planes. Each inhibit winding intersects all the cores of an individual plane and is shown in detail in FIG. 2. For example, FIG. 2 illustrates the inhibit winding and sense winding for any of the four planes of FIG. 1. These inhibit windings coact with corresponding windings from the X and Y address to store information in a designated core as will be explained. Starting with an empty memory, data is written into the planes 16 and 18 of the main memory matrix in the form of either a "1" in which the inhibit winding of the corresponding core arbitrarily is not energized, or a "0" in which the inhibit winding to the corresponding core is energized. Simultaneously, in the present embodiment, a "1" is written into a core on the memory plane 14 when writing into an odd numbered address in the planes 16 and 18 of the main memory matrix. For example, the first odd numbered address for each plane in this illustration is located at the upper left-hand core of each plane followed by the cores which correspond to the fist even address in the horizontal plane. The fifth address is located directly below the first address in each plane. A "1" utilizing the appropriate X and Y windings and inhibit windings is written into a core of memory plane 12 when writing into an even numbered address as in planes 16 and 18 of the main memory matrix. In this manner, the inhibit windings are conditioned to enter data into the memory matrix at a particular address as selected by the X and Y address windings.

Referring to FIGS. 1 and 2, X address register 24 is shown having segments on either side of the memory matrix for convenience of illustrating the feeding of digital address information to the appropriate X address windings of the four memory planes. Also there is shown a Y address register 26 which feeds Y address information to the appropriate Y address windings of the four memory planes. The X and Y address windings intersect at the selected address and thus enter the appropriate data from the data word register 20 by way of the inhibit windings 28. FIG. 2 shows a conventional sense or output winding 30 which intersects all the cores of an individual plane and detects the status of a selected core. Thus, each core of the main memory matrix contains the conventional four windings, namely X and Y address or selection windings, an inhibit winding 28, and a sense or read out winding 30 as shown in FIG. 2.

When a core in an individual plane changes state, it generates a signal or pulse in the sense line 30 shown in FIG. 2, that is detected by the corresponding sense amplifier in sense amplifier unit 31 during a read out operation in response to actuation by a read strobe. The outputs of the individual sense amplifiers are control signals and data which are fed to a conventional output register 32, such as, for example, comprising a plurality of flip-flops which store the retrieved memory data prior to its external usage, by a computer, display or other utilization device, and also provides control signals from the additional memory planes to actuate a control unit to determine read or write functions. To write into the memory, the desired address is selected in the main memory matrix by selecting the appropriate X and Y register lines. The input data is available on the inhibit windings of the planes. A conventional write current source 34 for the X address windings and a conventional write current source 36 for the Y address windings are energized by a write strobe command on line 38. As readily understood a strobe is a conventional trigger signal. When an appropriate output line from the Y address register 26, for example, line 40 is selected, it actuates transistor 42 in conventional Y address decoder 44 to conduct and apply an appropriate Y select current from write current source 36 into Y address select winding 46. In like manner, X current source 34 in response to its write strobe command transmits a current through transistor 48 in X decoder 50 which conducts in response to a signal applied to its base from X address register 24. This current thus is applied to X address winding 52. The Y address winding 46 and X address winding 52 intersect at core 7a in plane 18, core 7b in memory plane 16, and also core 6 in plane 14 and core 7c in plane 12 for reasons which will be described.

Simultaneously, to complete the current paths for the X address windings, additional transistors in a portion of X decoder 50 illustrated for convenience at the left side of plane 12 are enabled from the left hand segment of X address register 24. For example, X address winding 52 is connected to the collector of transistor 54 by way of a current equalizing resistor 56 and isolation diode 58. When transistor 54 conducts, it provides a ground return path for the write current source 34. In like manner, the current path in Y address winding 46 is completed by conduction of appropriate transistor 60 in the Y address decoder 44 by way of its current equalizaton resistor and isolation diode. In this manner, data is written into a selected memory address.

To retrieve or read out this data from a memory address, a read operation is now described. In general, a read operation is achieved by reversing the direction of current through both the X and Y address windings, omitting the application of inhibit current to the inhibit windings, one of which is shown in FIG. 2, and actuating the sense amplifiers by a read strobe command. In particular, output line 62 from Y address register 26 is selected and actuates transistor 64 in Y address decoder 44 to conduct and apply a Y select current from read current source 66 into Y address winding 46 by way of isolation diode 68 and lead 47. It should be understood that during the previously described write operation with respect to winding 46, the read current source 66 does not apply a current to transistor 64. The current from read current source 66 travels in one direction from lead 47 along winding 46 through core 7c and associated vertically oriented cores in memory plane 12, and thence to conducting transistor 60 and ground return for source 66 by way of isolation diode 72 and current equalizing resistor 70. Also, the read current from lead 47 flows in the other direction along winding 46 through core 6 and vertically associated cores in memory plane 14, core 7*b* and associated vertically oriented cores in memory plane 16, and core 7a with the associated vertically oriented cores in memory plane 18. The current in winding 46 thus flows through conducting transistor 74 and to the ground return side of the current source 66 by way of isolation diode 76. In order to read out from the appropriate cores, both the X and Y address windings are simultaneously energized. In this instance, the X read current source 78 provides a read current by way of transistor 80 which is rendered conducting by an appropriate output from X address register 24. The read current flows through transistor 80 and its associated diode to winding 52 by way of lead 53. The read current flows in both directions in winding 52. In one direction, it flows through core 7*c* and horizontally oriented core 5*c* in memory plane 12, then to the ground return for current source 78 by way of current equalizing resistor 56, isolation diode 58 and transistor 54 which has been rendered conducting by an appropriate output from the X address register 24. The read current from X read current source 78 also flows along windings 52 through core 6 and core 4 in memory plane 14, core 7*b* and associated horizontally oriented cores in memory plane 16, and core 7*a* and the associated horizontally oriented cores in memory plane 18. From memory plane 18 the read current flows to the ground return for current source 78 through conducting transistor 82 in the X address decoder 50. Transistor 82 has been rendered conducting by an appropriate output from the X address register 24. In this manner, data which has been written into the main memory matrix planes 16 and 18 is retrieved, although any data which has been entered into additional memory planes 12 and 14 is also read out or retrieved.

The operation of additional memory planes 12 and 14 in connection with both the writing and reading operation of main memory matrix planes 16 and 18 will now be described. It should be noted that when writing into main memory matrix planes 16 and 18, data is not simultaneously written into both additional memory planes 12 and 14. Instead, data is also written into one of these planes and simultaneously read out of the other. During a read out operation, data is read out from all four planes simultaneously. In particular, during writing of data into the main memory planes 16 and 18 as described above, a selected core of additional memory plane 14, when arbitrarily connected as shown in FIG. 1, is written into during the writing of any data into an odd-numbered address in the main memory matrix. Simultaneously, the corresponding selected core of memory plane 12 is read out due to the wiring interconnections between the cores and direction of current flow from current sources as will be described in detail. An odd-numbered address in the matrix shown in FIG. 1 is defined herein as the address of the first or odd-numbered core starting at the left side of every horizontal row and then every second core thereafter on each horizontal row of the planes of the main memory matrix. Cores which are not shown connected in the additional memory planes 12 and 14 are not used and can be omitted.

When writing a word into the even address locations of the main memory matrix planes, data is written into a selected core of memory plane 12 and simultaneously the corresponding selected core of memory plane 14 is read out. The second core from each horizontal row from the left side of planes 16 and 18 and every second core thereafter in a horizontal row is arbitrarily defined as the locations of even-numbered addresses.

The X and Y address currents have been described for both the write and read out operations, for example, with respect to X winding 52 and Y winding 46. However, it should be understood that remaining X windings operate in the same manner as X winding 52 and the remaining Y windings operate in the same manner as Y winding 46. The direction of current flow for X and Y windings for both write and read conditions is now described. When currents of the proper polarity from such X and Y windings coincide at an individual core, for example, core 7*b* in memory plane 16, that individual core is preconditioned to change its magnetic state to a "1" or to a "0" in response to whether or not a current flows in the corresponding inhibit winding for that individual core, as determined by input data for that core which is stored in data word register 20.

For example, the X and Y address windings are energized with a current flowing in the plus direction, arbitrarily selected as flowing out of transistor 48 in the X address decoder 50, and flowing out of transistor 42 in the Y address decoder 44. Also, the corresponding inhibit winding 28 arbitrarily has no current flowing in response to information contained in the data word register 20. With this arrangement, the individual core at the junction of the X and Y address windings changes from its zero state to a "1" state unless the core already contains a "1". This is shown by the statement that to write a "1" into a core of the main memory matrix $I_x$ is positive, $I_y$ is positive and $I_D$ is 0. The positive notation refers to direction of current flow in the X and Y address windings during a write operation where $I_x$ refers to current flow in an X address winding, $I_y$ refers to current flow in a Y address winding, and $I_D$ is the corresponding digit or inhibit current.

To write a "0" into an individual core in the main memory matrix, $I_x$ is positive and $I_D$ is present in a manner which prevents the core from switching. For reading information from a core in the present arrangement $I_x$ is negative, $I_y$ is negative and $I_D$ is zero. The negative notion refers to current flowing into transistor 82 of the X address decoder 50 and into transistor 74 of the Y address decoder 44.

While a tag is stored in additional memory plane 12 when writing a word into an even address, it should be noted that additional memory plane 14 has been added for the purpose of storing a tag or status indicating bit during writing into odd addresses of the main memory matrix. This indicating or status signal is stored in a core of the address previous to the corresponding or present address in the main memory planes and is used to indicate that the present main memory address contains data and should not be written into again until emptied by a read out operation. For example, cores 7*a* and 7*b* are presently being written into as previously described. Simultaneously, core 6 in plane 14, which is located one address previous to cores 7*a*, 7*b* and 7*c* is also written into thereby setting a tag into core 6 to be used for the forthcoming look-ahead feature. This is achieved by means of winding 52 which is threaded through cores 7*a*, 7*b* in address 7 and the branch of winding 52 threading from node 84, in accordance with the invention, through core 6 which is part of address 6 in additional memory plane 14, and then to core 7*c* in additional memory plane 12. When a subsequent or later write-in operation is writing data into the cores 6, 6*a* and 6*b* forming address 6 in the main memory matrix by way of X address winding 52, it provides a read current in core 6 to read out its previously stored tag and indicate that cores 7*a* and 7*b* of address 7 contain previously stored data which would be destroyed by overwriting data into address 7, which is the next sequential address. This indicating signal generated by the read out of core 6 of memory plane 14, flows through the sense winding 30 for core 6, as shown in FIG. 2, and into the appropriate sense amplifier in sense amplifier unit 31. This amplified signal provides a control signal to output register 32 which is used in a well-known manner to prevent further writing into address 7 until the data it now contains is extracted. This operation in which overwriting is prevented, herein defined as the look-ahead operation, is made possible by the threading of core 6 of the previous address, along with cores 7*a*, 7*b* and 7*c* of the present address. It should be noted that core 6, as wired in FIG. 1, is displaced one vertical column in the direction of the earlier or previous address. In addition to the above example, another example illustrating wiring of the first address is core 1*a* and core 1*b* in planes 18 and 16, respectively, which are threaded by the same wire which is connected to core 16*d* and core 2 of memory plane 14, and thence to core 3*c* and core 1*c* of memory plane 12 prior to terminating at X-address decoder 50. It should also be noted that while an X-address winding, for example winding 52, usually penetrates or threads all the cores in the planes of the main memory matrix, the winding only penetrates some of the cores of the additional memory planes. However, due to the requirement of a Y-address current coincident with an X-address current, one core in each memory plane is selected at a given time. The above description pertains to current flow in the X windings of the cores in both address 7 and 1 for the writing or storage of data in odd address locations of the main memory and the writing of a tag in one of the additional memory planes.

A description of the y current path used to write a tag while writing into an odd numbered address is as follows:

Current flows in winding 46 through core 7*a* in plane 18, core 7*b* in plane 16, through core 6 in plane 14 and through core 7*c* in plane 12. Again, core 6 in plane 14 which is located one address previous to cores 7*a*, 7*b* and 7*c*, has the tag written into it in conjunction with actuation of the above-described X winding. The following example illustrates the current paths with respect to data located in an even numbered address of the main memory. For example, when data is stored in even numbered address 6, that is cores 6*a* and 6*b* of planes 18 and 16, respectively, the write current in X-address winding 52 flows from the part of the X-address decoder 50 at the right side of FIG. 1 to node 84 and thence through the remaining branch of lead 52 from node 84 to cores 5*c* and 7*c* of plane 12 and back to core 6 and core 8 of plane 14. From core 8 current flows through conducting transistor 86 in the right hand illustrated portion of X-address decoder 50. Transistor 86 is rendered conducting by a signal from the X-address register which permits current flow in winding 52 to flow to the ground return from the X-write current source 34.

At the same time, the Y-write current source 36 feeds a Y-write current into line 88 by way of line 88*a* and a transistor and diode circuit identical to the combination shown connected to line 46. This transistor, not shown, is also energized from Y-address register 26. The Y-address current on line 88 flows through core 6*a* and the associated cores along line 88 in memory plane 18, through core 6*b* and its associated cores in memory plane 16, through core 5*c* and associated cores in plane 12, through core 6 and associated cores in memory plane 14, and thence to a ground return by way of a transistor, not shown, in the Y-address decoder 44 by way of current equalizing resistor 89. This transistor, not shown, is identical to transistor 60 and diode 72 which are also connected to a ground return. It should be noted in the present embodiment that the Y-address windings also contain a branch as does the X-address windings at node 84.

Referring again to FIG. 1, in operation, therefore, when data is written into an odd numbered address, for example address 7, current at node 84 flows first through the cores of plane 14 and then to the cores of plane 12 and to the ground return via current equalizing resistor 56 and transistor 54 which is rendered conducting by a signal from X-address register 24. While transistor 54 is conducting, transistor 86 in X-address decoder 50 is rendered nonconducting by a signal from X-address register 24. Thus, during either a read or write operation, current flow at node 84 is directed in only one of two possible directions by the X and Y address registers and X and Y decoders in response to a particular selected address.

In like manner, in operation, when data is written into an even numbered address, for example address 6, current at node 84 flows first through the cores of plane 12 and then through the cores of plane 14 and to the ground return via conducting transistor 86 in X-address decoder 50. Transistor 86 is rendered conducting by an appropriate signal from X-address register 24. In this instance, while transistor 86 is conducting, transistor 54 in X-address decoder 50 is rendered nonconducting by a signal from X-address register 24. It should be noted that transistor 54 and transistor 86 are rendered conducting by signals from the X-address register 24 in the absence of a "write after read" or WAR signal on conventional AND gates 90 and 92. Operation of these WAR circuits will be described in detail later.

The above writing procedure illustrates the look-ahead feature of the invention in that during writing of data into the main memory matrix, a status bit or tag is written into a core of one of the additional memory planes in order to indicate that data has just been written into a present address, and simultaneously an associated core in the second additional memory plane is read out to determine whether or not it contains a tag, the detection of which indicates that the subsequent address of the main memory has been written into and contains data, and is therefore not suited to receive new data. In this case, sense amplifier unit 31 generates a control signal which is used to prevent a well-known digital counter, not shown, forming part of the X and Y address registers, from incrementing to the next address. This prevents overwriting of data into an address which contains data. For example, when a tag is written into a core in memory plane 12, for subsequent use in response to data in an even numbered main memory address, a core in memory plane 14 is read out to determine whether it contains a tag. When a tag is written into a core in memory plant 14, for subsequent use due to data in an odd numbered main memory address, a core in memory plane 12 is read out to determine if it contains a tag. It should be understood that in the absence of a tag, no control or inhibit signal is provided, thus permitting the reading of a subsequent address in the X and Y registers to continue.

The invention further discloses that during a read out of information from the present address of the main memory matrix, data which is stored in the cores of one or the other of additional memory planes 12 and 14 is also read out during the read mode for the purpose of looking ahead to determine whether or not a subsequent address of the main memory was written into during a previous writing operation. Here, the read operation includes all four memory planes. Thus, when a subsequent address of an individual main memory plane contains data, its corresponding tag in additional memory plane 12 or 14, depending on whether the main memory address is respectively even or odd, is read out into sense amplifier unit 31. In absence of data in the subsequent memory address, a tag is not provided for detection by its sense winding and by sense amplifier unit 31. Consequently, during that read mode, no signal occurs to enable the address register to order a read out of the subsequent empty address.

Also, during the read out of data from the present address of the main memory matrix, since all planes are simultaneously read out, the tag which was written into a core of one of the additional memory planes during the previous writing operation, is now removed by this read out. That is, when the particular core contains a tag, represented by a "1", the read out resets that core to the zero state, thus indicating that the present address no longer contains data.

However, in one instance, during a writing mode, a tag in one of the additional memory planes, which was inserted during a previous writing operation to indicate that data was written into the main memory matrix, is now read out for its look-ahead indicating purposes as previously described. As a result, the tag is no longer available in the present writing mode to indicate the status of the subsequent main memory address or, as a tag for use in a later read out mode. For example, this tag, if present, would continue to indicate that data is contained in the subsequent address of the main memory matrix so that writing of new data does not occur over existing data. This tag also is used to indicate the presence of data to be read out during a later read out mode; absence of such a tag under these conditions would incorrectly indicate no data is stored in that address, inasmuch as data is present. It, therefore, becomes desirable in many applications to reenter this indicating tag in the same core location. This is achieved by a "write after read" or WAR circuit which is presently described.

In a writing mode, as described above, a tag in one of the additional memory planes is undesirably removed by the writing current which read out the core containing this tag. For example, to reinsert this tag into core 7c in plane 12 immediately after it is read out, a "write after read" or WAR current source 94 is provided which feeds a current through a conventional series pass transistor 96 which has been rendered conducting by signals from the X address register 24 and by a WAR signal applied to AND gate 98. Since address 7 was being written into, the X address register 24 and its decoder 50 are still at address 7 so that the tag is restored into core 7c prior to the next write or read command. It should be understood in the instance during the writing mode where no data has been stored in the subsequent address of the main memory matrix, no tag would be read out and, consequently, no activation of the WAR circuit to restore a tag becomes necessary. Thus the reading out of a tag during the write mode is used to generate the WAR signal which is applied to AND gate 98 and the other designated WAR gates of FIG. 1. The WAR signal, more particularly, occurs by the simultaneous presence into an AND gate, not shown, of the write mode command over line 39 and a signal resulting from the read out of a tag from the subsequent address of the main memory matrix.

The description of the X winding current path in connection with the WAR circuit operation is as follows. Conduction of transistor 96 occurs in response to simultaneous application of a signal from X address register 24 during address 7 and the above-described WAR signal. Current is thus fed through current equalizing resistor 56, core 5c and core 7c in plane 12, which latter core also simultaneously receives a WAR current from the Y address decoder 44. These simultaneous X and Y current inputs into core 7c rewrite a "1" into that particular core as will be described. Current in winding 52 flows through core 7c to node 100 and returns to ground by way of transistor 102 in X-address register 50. Transistor 102 is rendered conducting by the WAR signal applied to AND gate 104 and by a signal during the same address time from X-address register 24.

It should be understood that current flows through resistor 56, through cores 5c and 7c to node 100. From node 100 it flows only in the branch terminating at ground by way of conducting transistor 102 in X-address decoder 50. It does not flow from node 100 through core 6 in memory plane 14, node 84 and subsequent cores of main memory planes 16 and 18 which are connected to transistor 82 in the right hand portion of X-address decoder 50. This transistor 82 remains nonconducting due to the absence of the "not WAR", namely $\overline{WAR}$ signal, at AND gate 106. In particular, the signal from X-address register 24 is inhibited by AND gate 106 and not permitted to render transistor 82 conducting to provide current flow in that branch of line 52. In like manner, current flow is not permitted from node 100 and node 84 along lead 52 back to cores 5c and 7c in memory plane 12 to node 108. This is due to no current flow being permitted from node 108 through cores 6 and 8 in memory plane 14 and to transistor 86 in X-address decoder 50. This transistor 86 remains nonconducting due to the absence of a "not WAR" signal being applied, also during address 7, to AND gate 92. This latter signal prevents current from flowing to ground through transistor 86. The third path from node 108 is by way of lead 53a which is connected to X-address register 50 and to ground by way of a "not WAR" circuitry, not shown, such as transistor 86 and AND gate 92. This circuitry for convenience is not shown connected in the left hand section of X-address decoder 50. Thus, it becomes clear that during address 7 conventional timing circuitry, not shown, is used to enable the particular gate circuits to shunt the X address current through the desired cores. In this manner only cores 7c and 5c in plane 12 receive X-address current and only core 7c receives the simultaneous application of Y address current.

The description of the Y winding current path in connection with the operation of the WAR circuit follows. Application of such Y address current from Y address register 26 is applied to AND gate 112 at the same time a WAR signal is applied. The resulting output of gate 112 renders transistor 110 conducting which, in turn, applies a current from WAR current source 94 through transistor 110, its isolation diode, and current equalizing resistor 70 into cores 3c and 7c by way of lead 46 to node 114. From node 114 WAR current flows to ground by way of transistor 116 in Y address decoder 44. Transistor 116 has been rendered conducting, also during address 7, by a bias signal from AND gate 118. This latter bias signal is due to the simultaneous application of a WAR signal and a signal from Y address register 26 at gate 118. Thus, the above branch is rendered conducting and current flows through core 7c. Current is not permitted to flow in the other branch fro node 114 through core 6 and associated vertically oriented cores in plane 14, cores 7b and associated cores in plane 16, cores 7a and associated cores in plane 18, to terminate at transistor 74 in Y address decoder 44. Transistor 74 remains nonconducting due to the absence application of a "not WAR" signal at AND gate 120 which prevents the simultaneous signal from the Y address register 26 from biasing transistor 74 into conduction.

The above-described current paths into which current is prevented from flowing in the WAR mode, are used during the writing and reading modes when the WAR circuitry is not enabled, and the "not WAR" circuitry is enabled, such as during a writing mode when a tag is not read out, or during the reading mode. It should be understood that a WAR signal is present when the line conducting that signal is at the logic "1" state. At this same time, the line providing a "not WAR" signal is at the logic zero state. Also, when the "not WAR" signal is at the logic "1" state, the WAR signal is at the logic zero state. Arbitrarily, in this embodiment, the logic "1" state is selected to energize the associated gate and series pass transistor. For generating a WAR and "not WAR" signal, a well-known device is used, such as for example, a standard bistable multivibrator or flip-flop.

In operation of the memory system, a conventional write strobe is applied to line 38 to actuate X current source 34 and Y current source 36 to enter data from the data word register 20 into cores 7a and 7b of address 7 in main memory planes 18 and 16. The contents of data word register 20 in this embodiment is entered in a serial manner on line 19, such as from the output of a radar or other data source. This serial data is transformed in a conventional manner to a parallel output on four lines by a plurality of conventional flip-flops, not shown. The data word register 20 thus determines which of its four output lines contains a "1" or a zero prior to being fed into their respective digit drive amplifiers in digit drive amplifier unit 22. These drive amplifiers are connected to their corresponding inhibit windings on each of the four memory planes, one winding of which is shown in the illustration of FIG. 2. For example, inhibit winding 28 of FIG. 2 represents the inhibit winding which is associated with plane 16 of the main memory matrix of FIG. 1. The windings of such cores in plane 16 are shown, for example, in FIG. 2 of U. S. Pat. No. 3,215,992 issued Nov. 2, 1965 to J. W. Schallerer, which figure is herein shown as FIG. 5. When the particular inhibit winding is actuated, it coacts in a well-known manner with the X and Y address currents to write a "0" into the particular core selected by coincidence of these X and Y address currents. When a "1" is to be written into a selected core of a plane in FIG. 1, the inhibit winding does not contain a current and as a result the X and Y currents operate simultaneously to write a "1" into the selected core. As described previously, during the write mode, current for this write in operation enters a tag in the form of a "1" into core 6 of additional memory plane 14 to indicate data has already been written into the present address 7 and simultaneously the same current reads out core 7*c* in additional memory plane 12 in order to look ahead and determine the status of the next address, namely address 8 in order to prevent overwriting into that address. This look-ahead feature in accordance with the invention is accomplished by lead 52 being threaded through cores 7*a*, 7*b* of the main memory planes, core 6 of memory plane 14, and core 7*c* of memory plane 12. In this case, the tag for address 7 is contained in core 6 due to date being contained in the odd address cores 7*a* and 7*b*. If cores for even numbered addresses were written into, for example, the cores of address 6 of the main memory planes 16 and 18, then during the write mode a tag in the form of a "1 " is entered into core 5*c* of additional plane 12 to indicate that data has already been written into the present address 6. Thus, during a subsequent pass through the memory, the condition of address 6 is indicated when address 5 is being processed. The same current reads out of core 6 in plane 14 to look ahead while at address 6 and determines the status of the next address, namely address 7, to prevent overwriting into address 7 when that address is reached in the present writing sequence. That is, when new data is sequentially written into the memory, or the memory is sequentially read out, address 5 including core 5*c* is processed prior to address 6, which in turn is processed prior to address 7. Therefore, the contents of core 5c are used to look ahead and determine the status of address 6 prior to any sequential read or write order for that address. This look-ahead feature is achieved by lead 52 being threaded through cores 6*a*, 6*b* of the main memory planes 18 and 16, core 5*c* of memory plane 12 and core 6 of memory plane 14. The information read out from core 6 for the even-numbered address 6 and from core 7*c* for the odd-numbered address 7 is detected in sense winding 30 of FIG. 2.

During the write mode, X address current, when actuating an odd-numbered address, is caused to flow from the right hand portion of X address decoder 50 through, for example, winding 52 to node 84 into memory plane 14, thence to memory plane 12 and the left hand portion of X address decoder 50 including transistor 54, which conducts when an odd-numbered memory address has been selected. For writing into an even-numbered X address, write current flows from the right hand portion of X address decoder 50 to a ground return by way of winding 52, through memory plane 12, and then to memory plane 14 and to transistor 86 in the right hand portion of address decoder 50. These transistors are rendered conducting to provide the latter current flow by well-known and widely used digital logic in the X address register which operates upon the even or odd numbered input data in the inhibit windings as previously described. In like manner, for actuating with Y current an odd-numbered address, such as address 7, in the write mode, current is caused to flow from Y address decoder 44 through transistor 42, for example, Y address winding 46, through the four memory planes to the ground return by way of conducting transistor 60 in Y address decoder 44. In the same manner, for writing into an even-numbered address, such as address number 6, Y current flows in winding 88 in the same manner as in winding 46. Transistors 60 and 42 are rendered conducting to provide this Y current flow by well-known digital logic in the Y address decoder which operates upon the corresponding odd and even numbered data in the associated inhibit winding connected to data word register 20 by way of corresponding digit drive amplifiers in amplifier unit 22.

During the read operation, which is now described, both data from the main memory and the tags from the additional memory planes are read out. To achieve this, current from X-read current source 78 is caused to flow, for example, in odd address number 7, in winding 52 by conduction of transistor 80 in the left portion of X address register 50. Current flows through and thereby reads data in the selected cores 7*c* and 6, 7*b* and 7*a* of the four memory planes and thence into sense amplifier unit 31 by way of the sense windings for each plane, one winding 30 of which is shown in FIG. 2. This current flows to the ground return connected to conducting transistor 54 in the left portion of X address decoder 50. This current in winding 52 also flows to a second ground return connected to conducting transistor 82 in the right portion of X-address decoder 50. The two ground returns carry the current from X read current source 78 which branches at node 100 and flows to each ground return. Both transistors 54 and 82 for winding 52 are rendered conducting by well-known logic signals generated in X address register 24 in response to a conventional command signal which, in a well-known manner, sequentially selects the particular address by way of input lead 122 connected to the X address register 24. This lead is fed by a conventional program counter, not shown, which sequentially designates each address. Generation of read mode commands is generated in instructions in the associated computer for the memory, whenever it is desirable to read such data from the memory.

For read out of data in an even numbered address of the main memory planes 16 and 18, current flows from X-read current source 78 through a typical transistor switch, not shown, in X-address decoder 50. This switch is similar to transistor switch 80 and is enabled by a signal from X-address register 24. The current then flows into line 53*a* to node 108. From node 108 this read current travels to a ground return through address winding 52, through core 7*c* to which Y-read out current is simultaneously applied by way of line 46, and thence through core 5*c* in plane 12, through node 84 and through cores 6*b* and 6*a* in memory planes 16 and 18, respectively. These latter cores also have Y-read out currents applied in the well-known manner. Read current from node 84 flows to transistor 82 in the right hand portion of X-address decoder 50, thus completing a typical read out circuit for data in the X windings. It should be understood that no current flows from node 84 to node 100 inasmuch as transistors 54 and 102 in the left portion of X address decoder 50 are not conducting since they have not been selected by signals from X address register 24.

The path of a typical Y winding used in read out of data contained in the odd and even numbered addresses of the four memory planes is now described. For reading out data or information, both X and Y currents are simultaneously applied to their respective windings. The information thus read out is applied to the output register 32 by way of sense amplifier unit 31.

The Y current path for an odd numbered address is as follows: Read current flows from Y read current source 66, through transistor 64 and diode 68 in Y adress decoder 44, thence through lead 47 to node 114. From node 114 the read current flows through a first branch by way of lead 46 to read out from core 7*c* of additional plane 12. Current then flows through current equalization resistor 70, diode 72 and transistor 60 in the Y address decoder 44, and thence to ground. Transistors 60 and 64 are rendered conducting in the read mode by signals from Y address register 26 by way of lines 62 and 62*a*, respectively. Since the memory is in the read mode, the "not WAR" signal is present to cause conduction of the gate connected to transistor 60 in the manner previously described in connection with FIG. 1. Read current also flows from node 114 through winding 46 to read out of core 6 in plane 14 and core 7*b* in plane 16. This current also flows through and is read out of core 7a in plane 18, through diode 76 and transistor 74 in Y-address decoder 44 and thence to ground. Transistor 74 is rendered conducting due to a signal from Y address register 26 and the "not WAR" signal at AND gate 120. Reading out from the above cores when both X and Y read currents are applied, causes current to flow in the respective sense windings, when a "1" is stored, and no current to flow when a "0" is stored. For example, current in sense winding 30 of FIG. 2 flows into sense amplifier unit 31 which is coupled to output register 32. This data output of register 32 can be coupled to a utilization device such as a display unit associated with the memory.

Read out by Y current of the four memory planes for an even numbered address is due to current flowing from Y read current source 66, through a transistor and diode, not shown, which are similar to transistor 64 and diode 68. This read current then flows into line 124 and to node 126. From node 126, the read current flows through a first branch through core 6 in plane 14 by way of lead 88 to current equalization register 89, a diode and transistor, not shown, in Y-address decoder 44 to a ground return, not shown, this circuit being completed in a manner similar to that of diode 72 and transistor 60. Read current also flows from node 126 through winding or lead 88 to read out data from core 5*c* in plane 12, core 6*b* in plane 16, and core 6*a* in plane 18. This lead 88 is returned to a ground, not shown, by way of a diode and conducting transistor, also not shown, in Y address decoder 44. The Y-address decoder selects address 6 and renders the associated transistor conducting in conjunction with its associated "not WAR" signal as previously described.

It should be understood that during read out of data from the main memory planes, data is also read out of the two additional memory planes because the X and Y address windings thread through all the planes. However, data read out of a single addressed core of one of the additional memory planes is used in the look-ahead feature, that is, to examine the subsequent address. For example, the current through the elements or cores of plane 12 is used to provide the look-ahead indication when an odd numbered address is being read out. At the same time, this same read current is used to reset a zero or remove any tag previously introduced into a specific core in additional memory plane 14. When an even numbered address is being read out, the current through the cores of plane 14 is used to provide the look-ahead indication. At the same time, the same read current resets to zero and thus removes any tag previously introduced into a specific core in additional memory plane 12. Signals produced by the reset of the above cores are not used although the same current causing these resets is used to activate the look-ahead cores.

Referring to FIG. 3, there is shown an illustrative wiring diagram of a typical single X and single Y address winding, such as is shown in FIG. 1, the data input or inhibit and output or sense windings and remaining circuitry being omitted for convenience and clarity. Corresponding parts in FIG. 1 and 3 bear the same numbers. In operation, therefore, when main memory cores 7*a* and 7*b* of address 7 are written into by a current from X write current source 34, it simultaneously writes, by way of winding 52, a tag into core 6 of additional memory plane 14. During the next time core 6, which is part of address 6, is addressed, the latter tag indicates that a word has been previously written into address 7 of the main memory matrix. Thus, the next time address 6 is activated, this tag in core 6 performs the look-ahead feature of the invention and prevents overwriting into address 7. This is achieved by the wiring of winding or lead 52 which is made to thread all cores the cores of address 7 in the main memory matrix and to loop back to core 6 in additional memory plane 14 and thence ahead to core 7*c* in additional memory plane 12. This latter memory plane 12 is used to perform the look-ahead feature of the invention whereby the same current which is sued to write into core 6 is also used to perform a reading operation of core 7 in additional memory plane 12. In this writing mode, current flow is from X-write current source 34 to ground by way of transistor 54. In like manner, write current in the Y address winding 46, which is used with the X current to change the magnetic state of the cores, flows from Y write current source 35 through winding 46, cores 7*a*, 7*b*, 6 and 7*c* to ground by way of transistor 60.

When writing into address 7 while core 7*c* in plane 12 contains a tag indicating that subsequent main memory address 8 contains data, this tag is undesirably read out of core 7*c* and lost, unless another tag is restored to this memory location. While reading out of address 7, when address 8 contains obsolete data, the tag is also undesirably read out and lost. The read and write functions with respect to the cores in planes 12 and 14 are reversed when an even numbered address, such as 6 or 8 is activated in the main memory matrix. If address 8 contains data, the tag indicating such data is lost by the read out, and hence it is desirable to restore this tag for subsequent indication of such data. To achieve this, the actual read out of the tag from core 7*c* into the sense amplifier unit 31 of FIG. 1 activates, as previously described, the WAR or "Write After Read" operation to restore a tag to core 7*c*. In the event core 7*c* does not contain a tag, the WAR circuit remains inactive. In the WAR operation, current in the X address winding flows from WAR current source 94 through transistor 96, core 7*c*, and thus restores the tag in core 7*c*. From this core, current flows by way of lead 52 to ground through transistor 102, which, as previously described, is rendered conducting by the WAR signal and the present X-address signal. The WAR signal is generated by a well-known gate, not shown, which is actuated by the presence of both the write mode command and the read out of the tag from core 7*c*. In like manner, current in Y address winding 46 flows from WAR current source 94, through transistor 110, through core 7*c* in plane 12 to restore the tag in core 7*c*, and thence to ground by way of transistor 116 which has been rendered conducting by the output of a well-known gate device 108, which receives the combination of a WAR signal and a present signal from the Y address register. In this manner the remaining cores in the other planes are not affected by the WAR circuit. The WAR signal, in turn, is provided by another well-known gate, not shown, which is actuated by the presence of both a write mode command signal and a tag which is read from core 7*c*. In the WAR operation, it is noted that current through core 7*c* flows in the opposite direction to the current which was used to read out the tag from core 7*c*. In the above manner, any tag lost by read out of core 7*c* while in the write mode, is replaced. In the read mode the above operation is not used because a tag does not exist under these conditions.

The X and Y current flow during the read mode will now be described. During the read mode, as seen in FIG. 3, current flows from X read current source 78 to transistor 80 to node 100. From node 100 current branches and flows through and with the appropriate Y current, as understood, reads out the content of core 6 in additional memory plane 14, core 7*b* in plane 16, core 7*a* in plane 18 and then flows to ground by way of transistor 82. The signals read out of these cores are, of course, red to their respective sense amplifiers in sense amplifier unit 31 and to output register 32 by means of the respective sense windings for each plane shown in FIG. 2. This read out occurs when both the X and Y address currents are applied, and no current flows in the inhibit winding. During this read out mode, the reading of core 6 removes the tag which was previously written in core 6 during the write mode. This read out of the tag from core 6 resets that core to zero, and no further use is made of this read out. The corresponding cores 7*a* and 7*b* of address 7 are now emptied by being reset to zero.

During this read out mode, X current branches from node 100, through core 7*c* in additional memory plane 12, to ground by way of transistor 54 which is rendered conducting by a signal from AND gate 90. This gate is activated by simultaneous application of the previously described "not WAR" signal and a signal from the X-address register. Read out of core 7*c* in additional memory plane 12 occurs in conjunction with the Y read current and provides the look-ahead feature of the invention by determining the status of the subsequent address 8 as shown by X address winding 52 of FIG. 1.

The cores of address 8 are omitted from FIG. 3 for the sake of simplicity; the second winding for each core has also been omitted inasmuch as the operation of this winding has been previously described and shown in FIG. 1. The other winding on core 8, as shown in FIG. 1, is used to write a tag into core 8 of plane 14, when writing into address 9 of the main memory matrix. This operation is also described in connection with FIG. 1. At the same time that the X winding 52 of FIG. 3 is energized, Y address current from the Y read current source 66 flows through transistor 64, through winding 46 to read out the content of core 6 in additional memory plane 14, and the content of core 7*b* and core 7*a*. The current then flows to ground by way of transistor 74. The AND gate 120 feeding transistor 74 is activated by a signal from the Y address register and the "not WAR" signal to provide a current path in the same manner as AND gate 90 previously described.

Read current in Y winding 46 of FIG. 3 branches from node 114 through core 7*c* in additional memory plane 12 to ground by way of transistor 60 which is rendered conducting by a signal from its associated AND gate in a manner previously described with respect to gate 90. Read out of core 7*c* occurs when current is flowing in both its X and Y read windings and provides the look-ahead feature of the invention by reading out a tag to indicate the status of the content of the subsequent main memory address 8. As noted in connection with the description of the read out of core 6 in connection with the X winding, the core is read out during the application of both X and Y read current and at the same time as core 7*c* is being read out. This read out of core 6 removes the tag which was written into core 6 during a previous write mode. This read out from core 6 is used in resetting the core to zero and the cores of address 7 are also reset to zero.

The operation of the additional memory planes in connection with an odd numbered address 7 is seen for illustration purposes in FIG. 3. In this instance, a tag is written into core 6 of plane 14 while reading a previous tag out of core 7*c* in plane 12. When an even address, such as 6 or 8 is selected, the functions of the cores in additional memory planes 12 and 14 are reversed. The core in additional memory plane 12, which corresponds to the core in planes 16 and 18 at address 6 or 8 in the main memory matrix, now receive a tag during the write mode, and the core in additional memory plane 14 corresponding to the cores in planes 16 and 18 at address 6 or 8 in the main memory matrix is now read out. During the read mode, however, the cores in all memory planes for a specific address are read out, as previously described.

In this manner, a monitoring of a future or subsequent address to determine whether the next address location is empty or not is achieved. As a result of this monitoring operation, the signal thus produced at the output of register 32 of FIG. 1 is used in a well-known manner to actuate a well-known program counter, not shown, which supplies in serial counting manner another address containing an instruction as to whether the writing process should continue, stop, or search for another address location. After the writing mode, including any write after read operation, is completed, the program counter is used to initiate the next instruction from a well-known address register, not shown, which initiates a read operation of a particular sequence of addresses from a particular group of stored instructions according to well-known digital techniques based on a specific application. For example, raw input data from a radar can be stored at a high speed and read out at a lower speed for radar signal processing to determine, for example, whether the signal contains valid target information or only noise.

Referring again to FIG. 1, a program counter, not shown, in accordance with widely used digital techniques provides instructions for performing the above operations in a predetermined sequence and feeds particular address information into input leads 122 of FIG. 1 as well as providing program instructions, such as writing and reading commands. Output register 32 provides two outputs from the planes of the main memory register and two outputs from the additional memory planes.

A control signal on line 146 is provided in response to an empty memory location in the read mode or an occupied memory location in the write mode. This control signal, appearing at the output of register 32, corresponds to the particular sense amplifier for a specific core in one or the other of additional memory planes 12 and 14. The output of these latter planes are converted to line 146 by way of a pair of AND gates 148 and 150 which gate only the look-ahead signal into line 146 by way of OR gate 144. This is achieved by providing an odd address signal from the program counter, not shown, to AND gate 148 and an even address signal from the program counter to AND gate 150. Thus, the look-ahead tag from plane 12, for example, is gated through AND gate 148. The look-ahead tag from plane 14 is gated through AND gate 150. Since either of these signals are utilized, they are fed to an OR gate 144 and to control unit 130 by way of line 146. Line 146 is connected to a pair of AND gates 132 and 134. The other input of such gates is used to insert an initial external read or write input command from, for example, a radar system or computer when it is desired to take control of a particular read or write mode. If the memory is in a read mode, gate 132 provides an output signal which sets well-known bistable flip-flop 136 to provide a write mode command and prevent reading from an empty memory location. When a signal is provided at gate 134, when in the presence of a write mode input signal on its other input lead, gate 134 actuates a conventional monostable multivibrator 138 to start a WAR mode operation. At the end of a predetermined period, multivibrator 138 ends the WAR mode operation and resets flip-flop 136 to provide a read mode command signal when a tag has been destroyed, thus preventing overwriting at a particular memory location. The WAR operation, as well as the write and read operations, are, as is known, under control of well-known timing pulses and delays, not shown, and supplied by a timing unit 128 contained in the control unit. Multivibrator 138 is activated by the output of gate 134 at the commencement of a WAR operation. The invention thus prevents overwriting and consequent loss of data by the look-ahead feature and also prevents the consumption of unnecessary power by preventing reading out of a memory address location which contains no data that is, a word which contains all zeros because the data has been extracted or was never entered. Because time is not expended in reading out from an empty address, this time can be used to read out from any of the addresses which contain information, or in performing a writing operation upon acceptance of new data. Also, if the writing process has been stopped due to the look-ahead operation, the reading process can be commenced or writing into another section of memory can be programmed. Thus, rapid interchange from a reading to a writing mode, or vice versa, is achieved without the danger of losing data from overwriting or waste of time in reading from an empty address.

Figure 4:
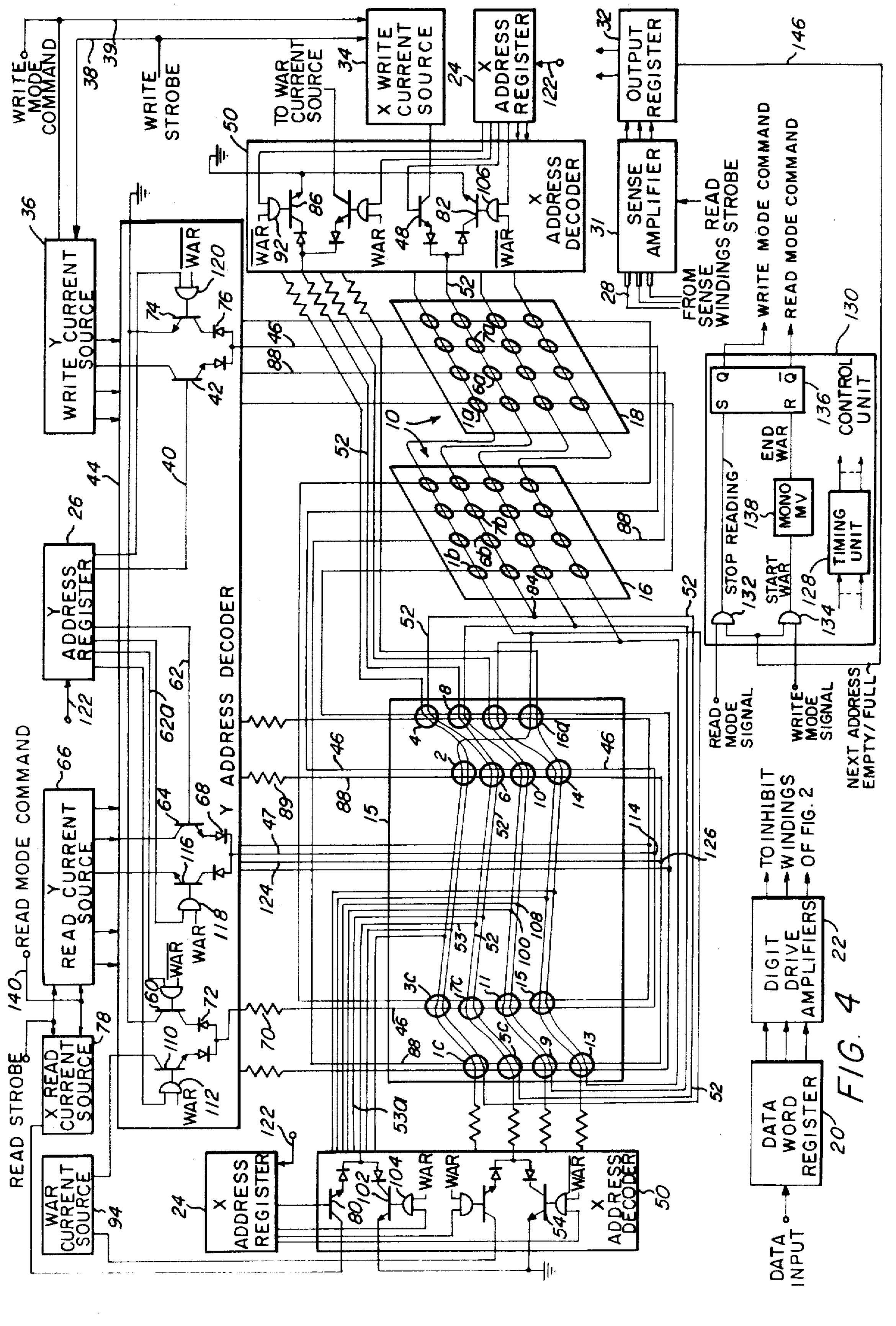
FIG. 4 is a schematic circuit diagram of a memory matrix of the invention using a single additional memory instead of the two additional planes shown in FIG. 1.

Referring now to FIG. 4 there is shown a further embodiment of the invention in which a single additional memory plane 15 is used in place of the pair of additional memory planes 12 and 14 of FIG. 1. Corresponding parts of FIGS. 1 and 4 bear identical numerals. As shown in FIG. 1, additional memory plane 12 used only odd numbered cores, the remaining cores not being used or present. In like manner, additional memory plane 14 used only even numbered cores. In FIG. 4, the cores which are used in additional memory planes 12 and 14 of FIG. 1, are now combined into a single additional memory plane in which both odd and even numbered cores of planes 12 and 14 are used. In this embodiment, the unused cores of memory planes 12 and 14 of FIG. 1 are omitted from FIG. 4, and the cores which are used are physically positioned in a single memory plane 15, the current through each of the windings, transistors, diodes and other components remaining the same inasmuch as the interconnection of these cores remain the same. Consequently the operation of the circuit is the same as that of FIG. 1 and need not be described. That is, in describing FIG. 4, plane 15 is now substituted for both plane 12 and plane 14 of FIG. 1. It should be understood that since only one additional plane is used, one sense and one inhibit winding as shown in FIG. 2 is not used. Consequently, AND gates 148 and 150 and OR gate 144 of FIG. 1 are omitted from FIG. 4, the control signal for additional memory plane 15 being connected to sense amplifier 31 and output register 32 and thence to line 146 to feed the control unit with signals as previously described. Also, a pair of input lines to sense amplifier 31 and one output line from sense amplifier 31 are not used. In additional memory plane 15, it can be seen that cores 11 and 15 are the same cores as are shown below cores designated 3c and 7c in the vertical column of plane 12 of FIG. 1, and cores 10 and 14 of plane 15 of FIG. 4 are the same cores as are shown below the cores 2 and 6 in the vertical column of plane 14 of FIG. 1. In like manner, cores 9 and 13 of FIG. 4 are located vertically below cores 1c and 5c in plane 12 of FIG. 1. Additional memory plane 15 is shown larger than planes 16 and 18 merely for convenience inasmuch as plane 15, since it does not contain unused cores, can be of the same size as the other memory planes. The operation of this arrangement is as described in FIG. 1 in that it detects the status of a selected core in the additional memory to control the read-write operation, thus providing the look-ahead functions of the invention.

Thus, the present invention provides unique circuitry for writing into and reading out of a memory while preventing writing into an address location that already contains data and reading out of an empty word location, thus saving considerable hardware and power. Although a core memory has been used to describe the foregoing embodiment of the invention, other devices can be used by applying the same principles. For example, plated wire and plated film memories, or devices where the wiring of the circuit can be controlled is also included. In addition, while a four-by-four memory matrix has been described, it will be appreciated by those skilled in the art that other configurations could be used with a corresponding change in the row and column interconnections. Additionally, it will be readily apparent that more than four memory planes could be used so long as corresponding logic and input-output circuits were included for each plane.

Figure 6:
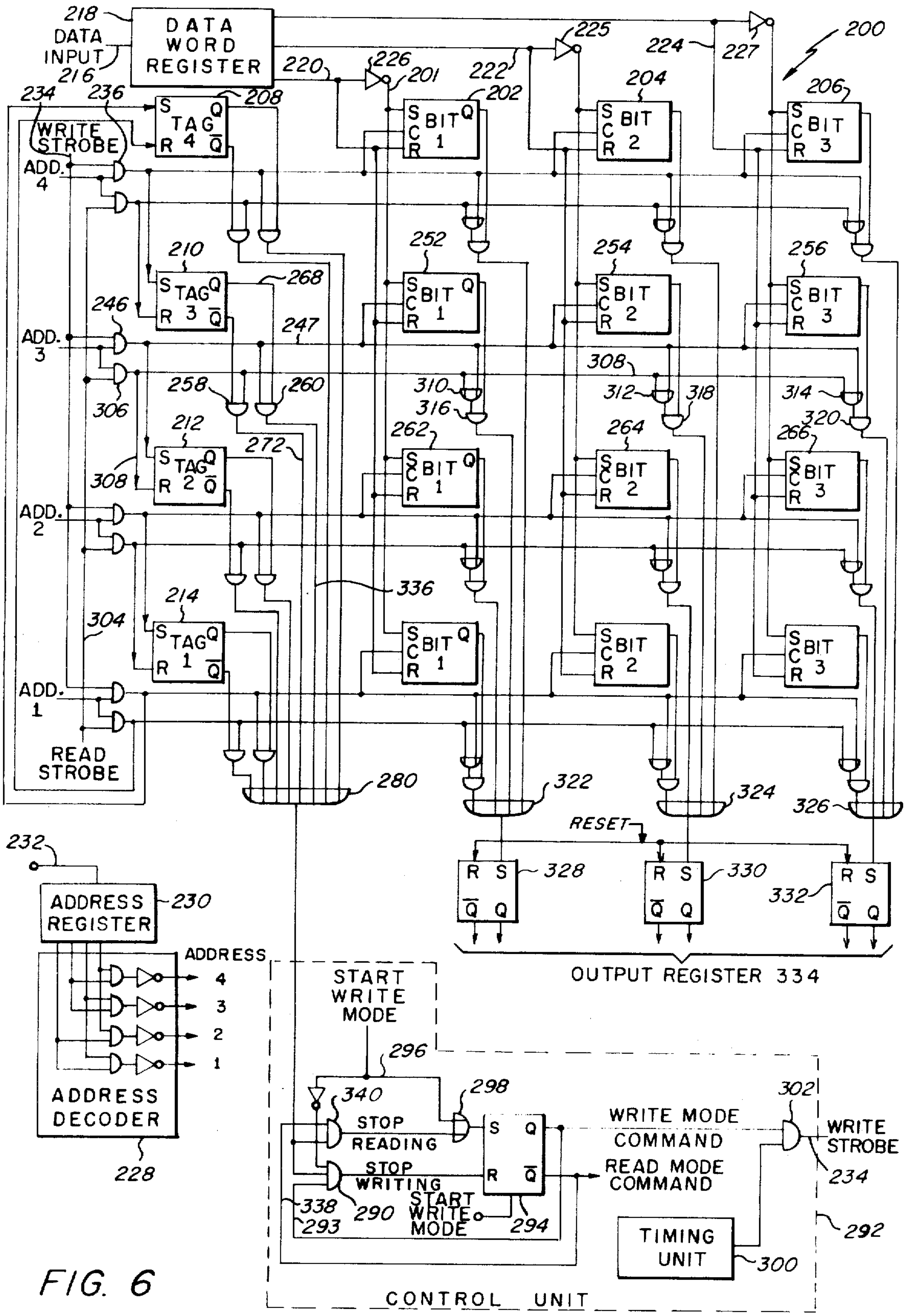
FIG. 6 is a partially schematic and partially logic diagram of an embodiment of the invention using bistable flip-flops.

Referring to the solid state or bipolar embodiment of FIG. 6 there is shown a matrix 200 of 12 conventional clocked bistable flip-flops used as storage elements to store input data and four additional tag indicating flip-flops. In this instance the main memory matrix is a four-word three-bit device. The three bits for address 4 are stored in the top row of flip-flops 202, 204 and 206. Each of the four-three bit words in the four rows is associated with a corresponding single additional storage flip-flop 208, 210, 212 or 214 which is used to store the status indicating bit for present and look-ahead indications. Each word is entered into the main memory matrix by way of line 216 connected to a data word register 218, which distributes the input data to all the flip-flops of the main memory matrix by directly connected input lines 220, 222 and 224. These lines are connected to one input of each conventional clocked bistable multivibrator or flip-flop and in this embodiment are selected to carry a logic "1". The other input lead 201, for example, to flip-flop 202 carries a logic "0" by way of inverting amplifier 226. Thus, all flip-flops in a single vertical column of the main memory 200 receive identical data. This data is entered into all three bits of a word by the selection of an address by conventional address decoder 228. This decoder is used to decode in a known manner the four inputs forming an address at the output of conventional address register 230 in response to an address on input lead 232 from a conventional program counter, not shown. The output of the address register 230 in this embodiment is fed to the decoder 228 which in this embodiment contains conventional AND gates which select one of the four address lines. These lines are connected to their respective address input lines in the matrix by way of conventional drive amplifiers shown included in decoder 228.

The well-known operations of the flip-flops in matrix 200 is explained as follows. Each clocked flip-flop, such as 202, 204 and 206, is a conventional binary device having two stable states and three well-known inputs. For example, the "S" or "Set" input and the "R" or "Reset" input receives either a zero or "1" at the time of the synchronization or clock pulse "C". Of the two conventional outputs designated "Q" and "not Q", only the "Q" output is used to read a "0" or "1" out of the memory depending upon the logic of the data entering the flip-flop. For example, when a "1" signal or logic "1" is presented to the "Set" input and "0" signal is presented to the "Reset" input and the clock input changes to a "1", the "Q" output then changes to a logic "1" state, if previously at the zero state. When a "1" signal is presented to the "R" or "Reset" input and the "0" signal is presented to the "S" input and the clock input changes to a "1", the "not Q" output, not shown, proceeds to the "1" state and the "Q" output proceeds to a logic "0" state, if not already there. If the outputs are already at the desired state, they remain at that state. Because of the inverting amplifiers 225, 226 and 227 of the matrix, the "S" and "R" inputs are never presented with two "1"s or with two "zeros"; that is, if one input is a logic "1", the other must be a logic "0".

In writing a word into the matrix, it can be seen that when the write strobe is applied to strobe line 234, assuming, for example, address 3 has been selected by decoder 228, this combination of the strobe and address 3 energizes AND gate 246 to apply a clock pulse by way of line 247 to the clock pulse input of flip-flops 252, 254 and 256 forming address 3. When the set "S" input of any flip-flop contains, for example, a "1" at the time of the clock pulse, these flip-flops will be set to the logic "1" state. When the reset "R" input of any flip-flop receives a "1" input at the time of the clock pulse, the flip-flop is reset to the logic zero state. Thus, the flip-flops 252, 254 and 256 of address 3 contain any combination of "ones" and "zeros" depending upon the status of input lines 220, 222 and 224. Input data on line 216 can be from a radar, computer or input device which has been converted in a well-known manner to digital data. Thus, for example, an analog radar signal can be converted into a three bit digital word by a conventional A-D converter, not shown. Of course, digital data directly from a computer does not require such conversion.

In the present embodiment of FIG. 6 it should be understood that matrix 200 may contain old data which is no longer useful and can be destroyed by introducing new data into the matrix. Thus, when data is being written into the aforementioned address the flip-flops, for example, of address number 3 need not be previously cleared. That is, the new data is permitted to overwrite the old or previously written data. The previous core memory embodiments are cleared by the read out operation. For the present case, overwriting occurs unless an inhibiting operation is provided as will be described. However, additional write after read circuitry for restoration of status signals is not used in FIG. 6.

When data is written into address 3, a tag, in accordance with the look-ahead feature of the invention, is also written into tag flip-flop 212 to indicate that particular address now contains valid or new data. Simultaneously, tag flip-flop 210 reads out the status of address 4, that is, whether or not address 4 contains valid data for future reference. A tag is thus written into flip-flop 212 by way of AND gate 246 which, in response to a write strobe and address 3 selection signal, energizes line 247 to set tag flip-flop 212 to the "Set" state representing a "1" at the "Q" output terminal. The status of address 4 is read out or detected by determining the state of tag flip-flop 210. This detection occurs by means of feeding the strobe on line 247 to AND gate 260 which provides a gate signal to one input of the AND gate 260. The gate signal permits the Q output from tag flip-flop 210 on line 268 to be applied to OR gate 280. When this "Q" output is at a logic "1", a logic "1" is applied to OR gate 280. When the "Q" output on line 268 is at a logic "0", a logic "0" is applied to OR gate 280. The other inputs to OR gate 280 are at a zero state during this period because only a single address, herein shown as address 3, is presently energized or called out from the memory at one time. When a "0" is applied to all inputs of OR gate 280, during the write mode, it provides a "0" output signal at gate 280 which indicates that the subsequent address, in this example address number 4, does not contain valid data and, thus, can be written into. When a "1" is detected in any of the tag flip-flops and applied to any input of OR gate 280, during the write mode, a "1" output or control signal at gate 280 is provided which indicates that the subsequent address, in this example address number 4, contains valid data and this address should not be written into. Consequently, overwriting is prevented.

When the output at OR gate 280 is a "0", AND gate 290 in control unit 292 does not provide an output signal, thereby permitting data to be entered into subsequent address 4. However, when the output at OR gate 280 is a "1", AND gate 290 now provides a "stop writing" output signal because it input from the "Start WRITE" mode trigger on line 296 and from the WRITE mode command signal on line 293 are also at the logic "1" level. The "stop writing" output signal resets the conventional Read-Write flip-flops 294 to the Read mode state which provides a Read mode command signal. To initiate a WRITE mode command, a Start Write mode trigger is provided in a well-known manner and applied to line 296. This trigger is then applied to a conventional OR gate 298 to set flip-flop 294 to the WRITE mode, if not already there. The "-WRITE" mode output from flip-flop 294 is fed as one input to AND gate 302 which in conjunction with a trigger from conventional memory timing unit 300 provides the WRITE strobe signal on line 234. In the above manner, the invention shown in FIG. 6 forms the novel look-ahead feature which prevents overwriting into any address which was previously written into and thus contains valid data. This completes the description of writing data into the solid state memory of FIG. 6. It should be understood such memory can comprise tubes and integrated circuits in place of transistors.

Assuming now that it is desired to read data out of the solid state memory shown in FIG. 6, the following explanation is given. To read data out of address number 3, for example, the address number 3 input signal from address register 230 and address decoder 228 and the read strobe signal on line 304 are simultaneously present at the input to AND gate 306. These two signals actuate AND gate 306 which applies a signal by way of line 308 to activate OR gates 310, 312 and 314. The other input of these three gates is not present nor is its presence required at this time. The output of one of these OR gates, for example, OR gate 310 is applied to one input of AND gate 316. The other input of AND gate 316 is a "Q" output of flip-flop 252 which is bit number 1 of address number 3. When flip-flop 252 contains a logic "0", no output occurs at AND gate 316. Consequently, no output appears from OR gate 322 because all the other inputs to OR gate 322 are at a logic "0", inasmuch as only address number 3 was selected. As a result, flip-flop 328 is not set and remains in the zero state at which it was previously set and thus indicates a zero in the bit number 1 segment of the output register 334. On the other hand, when flip-flop 252 contains a logic "1", an output signal occurs at AND gate 316 which also appears as an output at OR gate 332. This output is used to set flip-flop 328 to the logic "1" state to store the data contained in bit number 1 of address 3. In like manner, flip-flops 330 and 332 either contain or do not contain logic "1" data according to the status of flip-flops 254 and 256 in address number 3. In this manner, output register 334, which in this embodiment is made up of flip-flops 328, 330 and 332, contains the data that was read out of current address number 3. When the contents of output register 334 are read out to a utilization device, not shown, flip-flops 328, 330 and 332 are reset to the "1" state in a well-known manner by a delayed read out trigger, not shown. The information contained in flip-flops 252, 254 and 256, in memory address number 3, is not altered, that is a nondestructive read out occurs when the information is transmitted to output register 334. The contents of output register 334 is then transmitted to the external utilization device which may, for example, comprise a computer or radar system.

For the read out mode, the look-ahead feature, in accordance with the invention, is now described using additional tag or status indicating flip-flops. Simultaneously, with reading out information from a memory address, the presence of a status indicating bit in the corresponding subsequent address is detected by interrogation, and, at the same time, a status indicating tag is written into the corresponding tag flip-flop for that address. When reading information out of address number 3, for example, AND gate 306 and line 308 are energized by both a read strobe and the selection of address number 3.

The output of AND gate 306 is one input to AND gate 258. The other input to AND gate 258 is the $\overline{Q}$ output, not Q output, of tag flip-flop 210. When the $\overline{Q}$ output of tag flip-flop 210 is at a logic zero, that is, when it is in a Set state, AND gate 258 is not activated, since in this embodiment two logic "1"s are required in activation of the memory AND gates. However, when tag flip-flop 210 is in the Reset state, the $\overline{Q}$ output on line 270 is at a logic "1". The state of tag flip-flop 210 indicates whether the subsequent address number 4 contains valid or obsolete information. In the present embodiment, the Reset state of tag flip-flop 210 indicates that the subsequent address number 4 contains obsolete information, that is, the information has already been extracted or no information was entered. The logic at the $\overline{Q}$ output of tag flip-flop 210 and the strobe on line 308 activate AND gate 258 and a signal on line 272 is applied to OR gate 280. The output of OR gate 280 is activated because only a single input is necessary to provide an output from an OR gate. The other inputs to OR gate 280 are not presently actuated because only address number 3 is being read out. Thus, when a "1" is detected in any of the tag flip-flops, it is applied to OR gate 280, which is thus actuated. The output of OR gate 280 and the signal on line 338 activates AND gate 340 in control unit 292. The output of AND gate 340 activates OR gate 298 and alters flip-flop 294 to the Set state, thereby terminating the Read mode state. The "Q" output of flip-flop 294 is now at the logic "1" state which is a Write mode state. The above procedure thus interrogates tag flip-flop 210 and prevents reading out obsolete information from the subsequent address number 4.

In summary, therefore, while information of the present main memory address number 3 is being read out and the look-ahead circuitry is determining the status of subsequent address number 4, a status indicating tag is written into or stored in tag flip-flop 212 to indicate that address number 3, from now on, will contain obsolete information because its present information is being read out for external utilization. This tag is written into tag flip-flop 212 by the signal out of AND gate 306 on line 308. This signal thus resets tag flip-flop 212. Thus, the logic "1" at its $\overline{Q}$ output indicates that address number 3 has been read out and contains obsolete information, thereby providing the look-ahead feature when the memory is again interrogated. There is thus provided the look-ahead feature of the invention which prevents overwriting of valid information, that is, information which has not yet been used by an external utilization device, and also prevents the reading out of obsolete information, that is, information which has already been used.

To indicate the manner in which, for example, the memory shown in FIG. 6 operates in connection with an external utilization device, such as a radar or computer, not shown, the following description of the storage of the last address in both read and write modes is provided. It should be understood that this same well-known digital memory technique can be applied to the other memory embodiments of the invention. This storage technique is intended to save operational time by reducing the time required to locate the next address to be used to write into or read out of the memory after a writing or reading operation was terminated. This is achieved by storing the last address used for both the read and write operation in two separate preassigned addresses or portions of the memory, not shown in FIG. 6. When either the read or write mode resumes operation, the last stored address is read out from this preassigned memory location. The contents of this preassigned address which contains only the last address used in either the read or write mode are then transferred to a well-known program counter, not shown. This counter is then indexed by adding a 1 to the transferred address. The contents of this program counter, which is an address, is transferred to address register 230 of FIG. 6 by way of line 232. The read or write procedure then resumes at the next memory address instead of the last address used when the read or write operation had terminated. Thus, incrementing in a well-known manner the contents taken from the preassigned address, assures that the next operation commences at the next valid address. It should be noted that two addresses are used, one for storing the last address that was read, and the other for storing the last address that was written into. It should be understood that in some memories, the memory may be divided into groups of addresses, in which case each group may have a preassigned pair of addresses.

Although this invention has been disclosed and illustrated with reference to particular applications, the principles involved are susceptible to numerous other applications, which will be apparent to persons skilled in the art. The invention is, therefore, to be limited only as indicated by the scope of the appended claims.

What is claimed is:

1. A memory system having writing means for storing and reading means for extracting digital data, said system comprising a magnetic matrix memory made up of rows and columns of storage elements to form a plurality of memory planes, each element in a plane exhibiting plural states of magnetic stability, a first additional memory plane adapted to store a status indicating bit in response to a word being written into a location of said memory planes, a second additional memory plane adapted to read out from said second additional memory plane a formerly stored second status indicating bit to determine whether or not a subsequent address location in said memory planes contains data, means in response to reading out the magnetic state of said second additional plane to generate a control signal, and means in response to said control signal to determine the operation of said reading and writing means.

2. A memory system for storing and retrieving digital data, said system comprising a main memory matrix made up of bit columns and word rows of bit storage elements, each of said bit storage elements exhibiting plural states of stability, means to set said rows of bit storage elements to states representing respective words of data, a first auxiliary memory plane made up of columns and rows of storage elements and electrically interconnected with corresponding columns and rows of storage elements in said memory matrix, means for reading out a first status bit in said first auxiliary memory plane when a corresponding location in said main memory matrix is being written into, a second auxiliary memory plane made up of columns and rows of storage elements and electrically interconnected with corresponding succeeding columns of storage elements in said main memory matrix, means for storing a second status bit in said second auxiliary memory plane when a corresponding location in said main memory matrix contains usable data, means for detecting said first and second status bits, means in response to detection of said first status bit to inhibit the introduction of additional data into a subsequent address of said main memory matrix, and means in response to detection of said second status bit to inhibit writing of additional data from said main memory matrix.

3. A memory system comprising a plurality of electrical elements connected in rows and columns to form a plurality of main memory planes, each electrical element in a plane exhibiting plural states of stability; input, output and word wires connected to each of said elements; an additional memory plane of elements having input and output wires coupled to corresponding wires on said main memory planes and word wires coupled to a corresponding preceding additional memory element to provide a status indicating signal; and means for detecting said status indicating signal to provide a control signal to halt entry of further data in a corresponding main memory plane subsequent to said additional memory plane.

4. A memory system comprising a plurality of magnetic storage elements forming the rows and columns of a plurality of data storage planes, each storage element in a plane exhibiting plural states of magnetic stability; input, output and word windings on each of said elements; means in conjunction with signals on a predetermined input winding and signals on word windings to store data in the storage elements through which said input and word windings intersect; an additional memory plane connected to store a status indicating bit in response to transfer of information from said word windings to their respective corresponding preceding storage elements in conjunction with activation of selected input windings; means for detecting the presence of said status bit in the additional memory plane; and means in response to said detection to prevent the input of further data until data has been cleared from the corresponding memory location.

5. A memory system for storing and retrieving digital data according to the status of a memory location, said system comprising a memory matrix made up of bit columns and word rows of magnetic bit storage elements each of which exhibits plural states of stability, means to set said rows of bit storage elements to states representing respective words of data, an additional memory matrix made up of a pair of memory planes of elements having a plurality of states for accepting respective bits of a word, each element associated with a row of said bit storage elements, means for generating interrogation pulses to provide tag indicating means in one element of said additional memory matrix for indicating the status of a present data storing location and for interrogating another element for indicating the status of a subsequent data storing location of said memory matrix, and means responsive to said indicating means to inhibit the handling of data at said locations.

6. A memory system comprising a plurality of storage elements interconnected in rows and columns to form a plurality of memory planes, each element in a plane exhibiting plural states of stability; input, output and word wires on each of said element; an additional memory plane of elements having word wires coupled to corresponding word wires on said plurality of memory planes, said word wires adapted to store in said additional memory plane a status indicating bit in response to a word being written into said memory planes in conjunction with said input wires; means for detecting said status indicating bit in an element of said additional memory plane to provide a control signal; means for rewriting a second status indicating bit into said element of said additional memory plane; means for reading out a word from said plurality of memory planes as determined by said output wires on said elements; and means in response to said control signal to halt the introduction of an additional word into a subsequent address of said memory planes.

7. A memory system having a main memory storage means including a plurality of memory planes and an auxiliary memory storage means having at least one additional memory plane operatively coupled to said main memory storage means, means for address activating the memory locations of said auxiliary storage means and corresponding locations in said main memory storage means, means for writing data into an address of the main memory storage means and simultaneously writing a status indicating bit into a corresponding preceding address of said additional memory plane, said means for writing data adapted to actuate means for reading the corresponding succeeding location in said additional memory plane to detect the presence of a status bit adapted to indicate that the next address location of said main memory storage means contains data, and means in response to the presence of a status bit in said additional memory plane to prevent overwriting data into the corresponding address location of said main memory storage means.

8. The apparatus of claim 7 in which additional means is provided for preventing reading out of used data from said next address location of said main memory storage means.

9. A memory system comprising a plurality of storage elements interconnected in rows and columns to form a plurality of memory planes, each element in a plane exhibiting plural states of stability; input, output and word windings on said elements, an additional memory plane of elements interconnected to corresponding preceding and subsequent elements of said plurality of memory planes; control means adapted to read out from said subsequent elements to prevent overwriting of data from said subsequent elements, said control means also including means for preventing reading out of obsolete data from said subsequent elements.

10. The apparatus of claim 9 in which means is provided for writing a status indicating tag into the preceding element of said additional memory plane during writing into elements of said plurality of memory planes.

11. In a memory system having a main memory storage means and a main storage address means for address activating the locations of said main memory storage means, the combination comprising an auxiliary memory storage means which is address activated by said address activating means for activating the locations of said auxiliary memory storage means, means associated with said auxiliary memory storage means to indicate the presence of data in a corresponding location in the main memory storage means, said auxiliary memory storage means adapted to indicate the status of the subsequent corresponding locations in the main memory storage means, and means in response to detection of data in corresponding present and subsequent locations in the main memory storage means to prevent introduction of data into such locations in the main memory storage means.

12. A memory organization for a digital computer comprising a main memory means, an auxiliary memory means of smaller capacity than said main memory means, coupled to said main memory means to receive information issued from said main memory means for tag indication, a determining means associated with said auxiliary memory means to determine the status of data stored in corresponding locations of said main memory means, said status determining means including status indicating means in conjunction with said auxiliary memory means to indicate the presence of data in subsequent corresponding locations in said main memory means, means responsive to an indication of data stored in said auxiliary memory means to prevent overwriting of additional data into said subsequent corresponding locations in the main memory means, and means to prevent initiating the reading out of obsolete data from a corresponding location in the main memory means.

13. A memory system comprising a plurality of storage elements connected in rows and columns to form a plurality of memory planes, each storage element in a plane exhibiting plural states of stability; input, output and word wires on each of said elements; an additional memory plane of storage elements having word wires coupled to corresponding word wires on said plurality of memory planes, each storage element in said additional memory plane coupled to a corresponding preceding element in said memory planes; and means for detecting the status of an element in said additional memory plane to provide a control signal indicative of the status of the corresponding portion of said memory planes.

14. A memory system comprising a plurality of storage elements interconnected in rows and columns to form a plurality of main memory planes, each storage element in a plane exhibiting plural states of stability; input, output and word wires on each of said elements; a first additional memory plane of storage elements having word wires coupled to corresponding word wires on said plurality of main memory planes, each storage element in said first additional memory plane coupled to corresponding elements in said main memory planes, and also coupled to a corresponding preceding element in a second additional memory plane, said word wires on said first and second additional memory planes adapted to store a status indicating bit in response to a word being written into said main memory planes in conjunction with said input wires; means for detecting said status indicating bit in an element of one of said additional memory planes to provide a control signal; means for rewriting a second status indicating bit into said one of said elements of one of said additional memory planes; means for reading out said word from said plurality of main memory planes as determined by said output wires on said elements of said plurality of main memory planes; and means in response to said control signal to halt the introduction of an additional word into said main memory planes by way of said input wires.

15. The apparatus of claim 14 in which the rewriting means includes means for directing flow of current in a direction through one of said additional memory planes opposite to that of current flow during detection of a status indicating bit.

16. A memory system comprising main memory means, auxiliary memory means, a first location of said auxiliary memory means interconnected with said main memory means to store a status indicating bit when data is written into corresponding locations of said main memory means, a second location of said auxiliary memory means interconnected with said main memory means in a manner adapted to read out a status indicating bit on a forthcoming read out cycle of said main memory means, and control means actuated by read out of said status indicating bits to prevent overwriting of valid data and read out of obsolete data from corresponding subsequent locations of said main memory means.

17. A memory system having a main memory and an auxiliary memory, address means coupling said main memory and said auxiliary memory means to store status signals in said auxiliary memory, said auxiliary memory having means to respond to present and forthcoming write in and read out signals from subsequent main memory locations to determine the presence of data in said main memory.

* * * * *

UNITED STATES PATENT OFFICE
CERTIFICATE OF CORRECTION

Patent No. 3,699,535 Dated October 17, 1972

Inventor(s) Stanley Frank Klein

It is certified that error appears in the above-identified patent and that said Letters Patent are hereby corrected as shown below:

On the cover sheet, on the line marked "Attorney" after "Joseph D. Pannone" insert --Herbert W. Arnold--

Column 1, line 44, delete "any word location or address which contains obsolete or no data,"

Column 3, line 5, delete "or" second occurrence and insert --to--.

Column 3, line 27, delete "singly" and insert --single--

Column 3, line 46, delete "heat" and insert --heart--

Column 3, line 60, delete "tows" and insert --rows--

Column 4, line 36, delete "fist" and insert --first--

Column 7, line 50, delete "notion" and insert --notation--

Column 8, line 50, delete "y" and insert --Y--

Column 12, line 33, delete "fro" and insert --from--

Column 16, line 3, delete"register" and insert --resistor--

Column 16, line 27, delete "a" and insert --to--

Column 16, line 64, delete "sued" and insert --used--

Column 17, line 3, delete "35" and insert --36--

UNITED STATES PATENT OFFICE
CERTIFICATE OF CORRECTION

Patent No. 3,699,535 Dated October 17, 1972

Inventor(s) Stanley Frank Klein Page - 2

It is certified that error appears in the above-identified patent and that said Letters Patent are hereby corrected as shown below:

Column 17, line 65, delete "red" and insert --fed--

Column 24, line 34, delete ""1"" and insert --"0"--

Signed and sealed this 27th day of November 1973.

(SEAL)
Attest:

EDWARD M.FLETCHER,JR.
Attesting Officer

RENE D. TEGTMEYER
Acting Commissioner of Patents